United States Patent [19]
Ellendt

[11] Patent Number: 5,038,565
[45] Date of Patent: Aug. 13, 1991

[54] PRESSURE GENERATOR FOR A HYDRAULIC VEHICLE BRAKE SYSTEM

[75] Inventor: Erhard Ellendt, Hemmingen, Fed. Rep. of Germany

[73] Assignee: Robert Bosch GmbH, Stuttgart, Fed. Rep. of Germany

[21] Appl. No.: 542,134

[22] Filed: Jun. 22, 1990

[30] Foreign Application Priority Data

Jul. 12, 1989 [DE] Fed. Rep. of Germany ....... 3922861

[51] Int. Cl.$^5$ .......................... B60T 17/00; B60T 8/42; F15B 7/00
[52] U.S. Cl. ..................................... 60/566; 60/533; 60/567; 60/591; 303/115
[58] Field of Search ................. 303/61, 113, 115, 116; 60/533, 565, 566, 567, 591

[56] References Cited

U.S. PATENT DOCUMENTS

| | | | |
|---|---|---|---|
| 3,677,610 | 7/1972 | Pauwels et al. ...................... | 303/113 |
| 4,162,108 | 7/1979 | Shimizu ............................... | 303/116 X |
| 4,624,508 | 11/1986 | Adachi et al. ....................... | 303/116 |
| 4,653,815 | 3/1987 | Agarwal et al. .................... | 303/115 X |
| 4,904,028 | 2/1990 | Leiber et al. ....................... | 303/115 X |
| 4,948,200 | 8/1990 | Leiber et al. ....................... | 303/115 |
| 4,950,028 | 8/1990 | Harrison ............................. | 303/113 X |

FOREIGN PATENT DOCUMENTS 3236366 4/1984 Fed. Rep. of Germany.

Primary Examiner—Edward K. Look
Assistant Examiner—John Ryznic
Attorney, Agent, or Firm—Edwin E. Greigg; Ronald E. Greigg

[57] ABSTRACT

The brake system has an apparatus for traction control having a pressure generator. The pressure generator has a longitudinally displaceable cylinder for receiving brake fluid. The cylinder is connected by means of a valve to a pressure course between a master brake cylinder and a wheel brake cylinder. An actuating element is provided for closing and opening the pressure course to the master brake cylinder as a function of the cylinder position. The actuating element, extending coaxially between the cylinder and the valve comprises a tube and furnishes hydraulic communication between the cylinder and the valve. If excessive drive slip occurs, brake fluid can be positively displaced out of the cylinder by longitudinal displacement thereof, and brake pressure can be generated in the wheel brake cylinder. The actuating element assumes a piston function, which enables a structure of the cylinder having a smaller diameter and a long stroke. This makes for more accurate adjustment of the brake pressure.

4 Claims, 2 Drawing Sheets

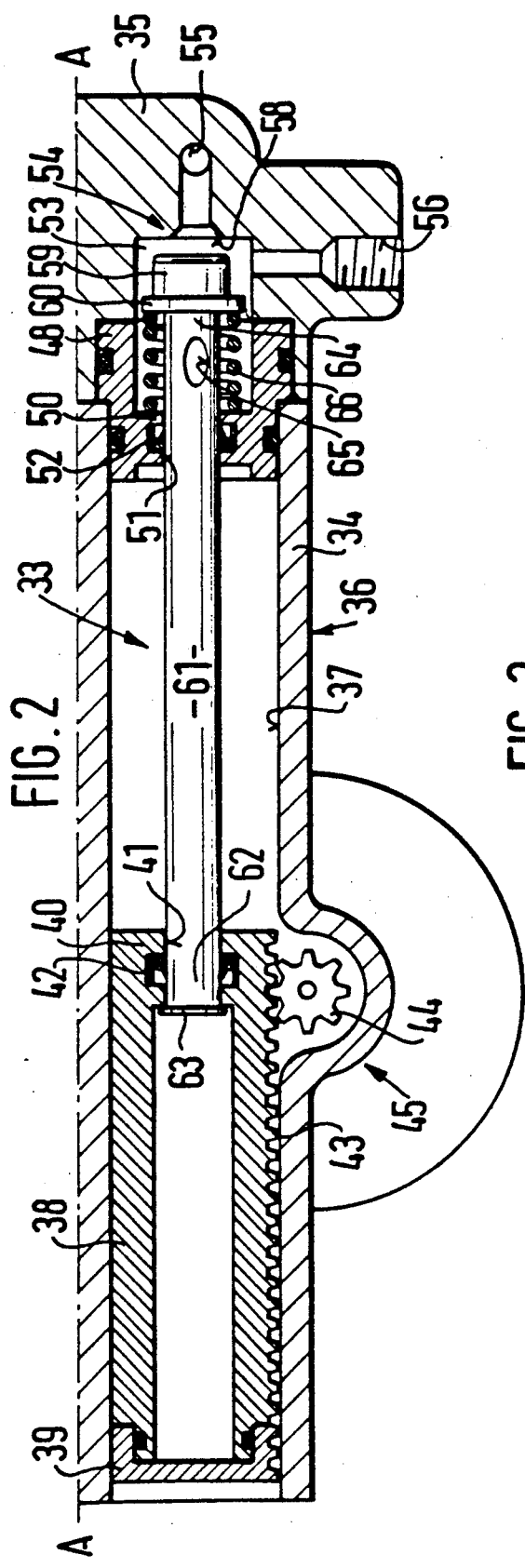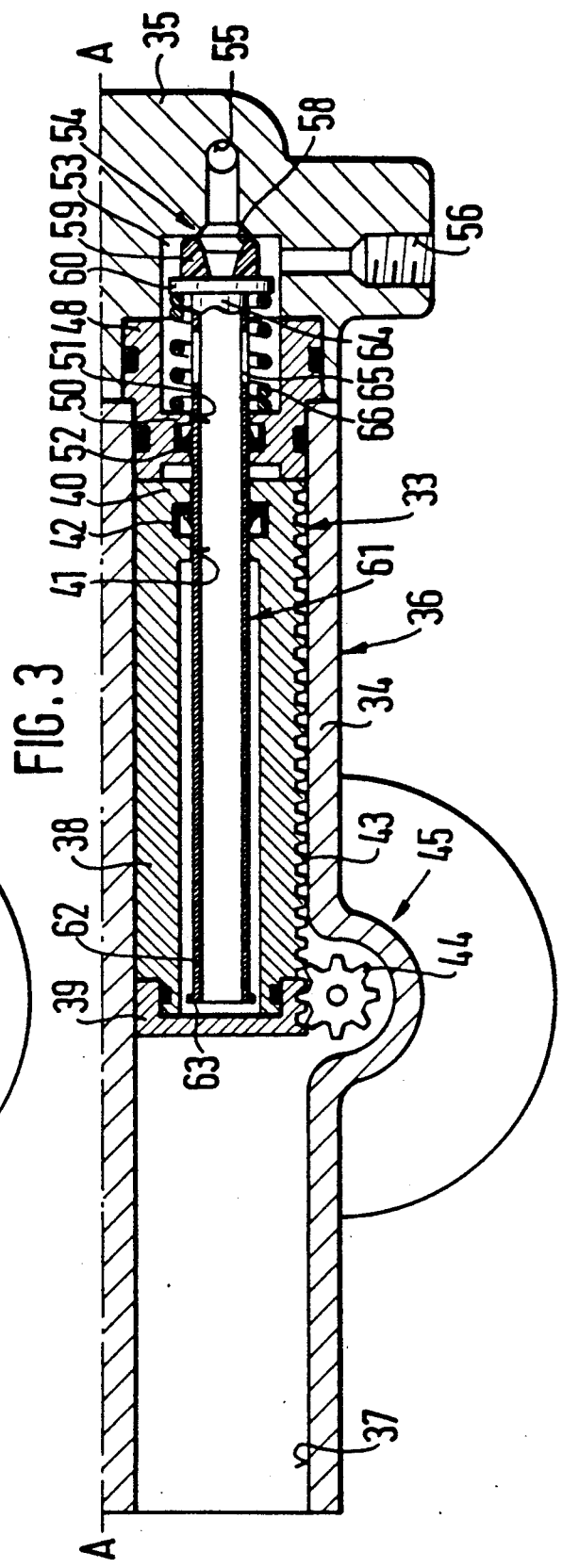

5,038,565

PRESSURE GENERATOR FOR A HYDRAULIC VEHICLE BRAKE SYSTEM

BACKGROUND OF THE INVENTION

The invention is based on a pressure generator for a hydraulic vehicle brake system as defined hereinafter. Such a pressure generator is already known from German Offenlegungsschrift 32 36 366; in it, a piston displaceable longitudinally counter to spring force, is received at the cylinder. The resiliently supported actuating element of the seat valve is located inside the piston. The actuating force for the pressure generator is generated by an electromagnet, which because of the relatively large piston cross section and short stroke must generate a strong armature force so that a sufficiently strong braking force will be available for traction control. This necessitates using a large and therefore heavy electromagnet, yet such a magnet reacts relatively sluggishly, so the traction control apparatus is unable to follow up changes in wheel rotation except after some delay. This greatly lessens the control quality of the brake system.

OBJECT AND SUMMARY OF THE INVENTION

The pressure generator according to the invention has the advantage over the prior art that the actuating element assumes the piston function, and accordingly provides a cylinder structure with a small diameter. As a result, the pressure generator can have a long stroke, making accurate adjustment of the brake pressure, in the wheel brake cylinder of the wheel having the excessively pronounced drive slip much easier. Furthermore, the actuating element serve as a line for the exchange of brake fluid between the cylinder and the pressure path to the wheel brake cylinder. The pressure generator can therefore be embodied as quite slender, with fewer parts compared with the known embodiment.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a longitudinal section through a pressure generator of the unit showing a cylinder in the outset position; and FIG. 3 shows the pressure generator of FIG. 2 with the cylinder in the operating position of maximum stroke.

DESCRIPTION OF THE PREFERRED EMBODIMENT

Figure 1:
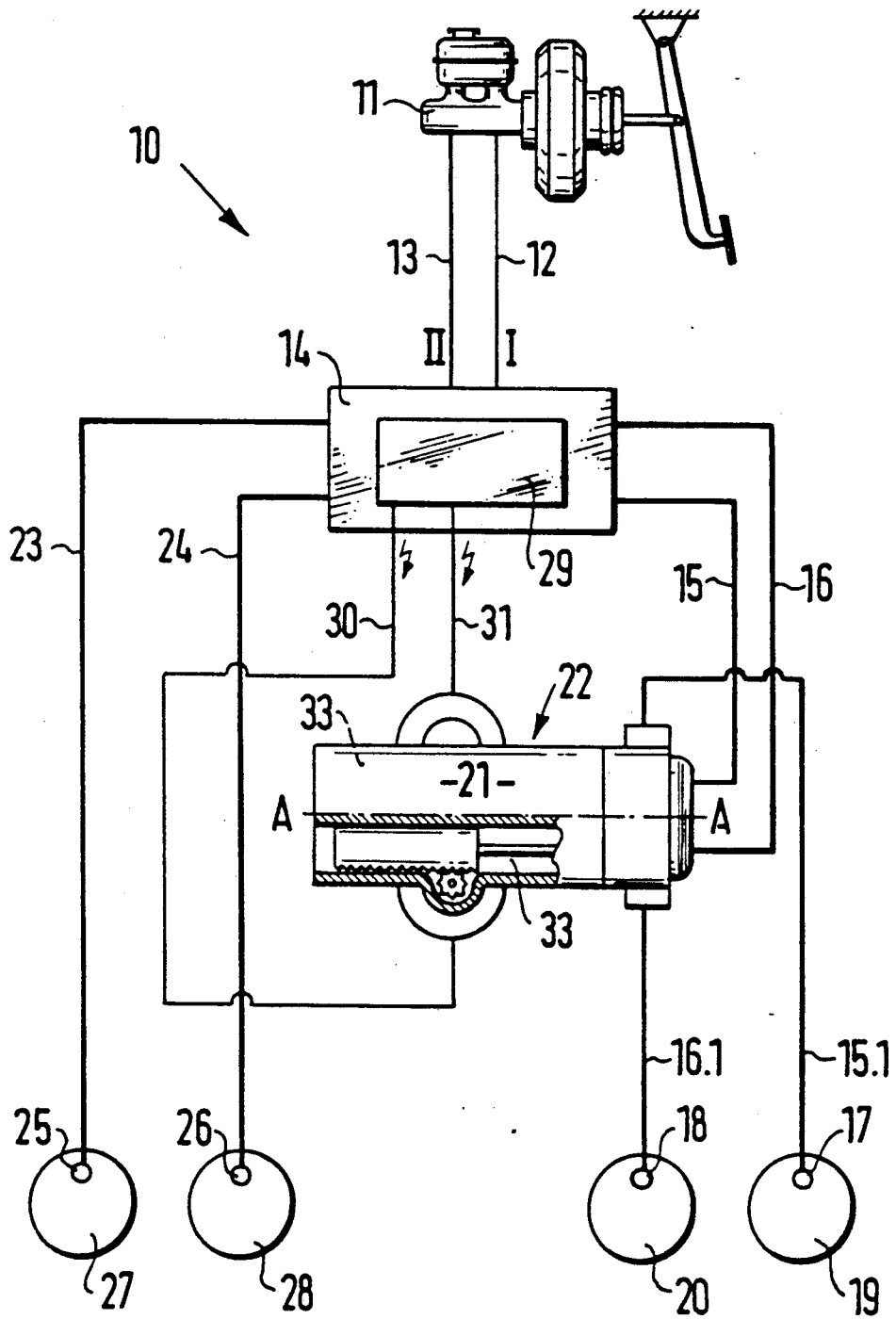
FIG. 1 schematically shows a hydraulic vehicle brake system having a pressure generator unit.

The layout of a hydraulic vehicle brake system 10 shown in FIG. 1 has a pedal-actuated master brake cylinder 11 for generating brake pressure. Connected to the master brake cylinder 11 are a master brake line 12 for a brake circuit I and a master brake line 13 for a brake circuit II. The master brake lines 12 and 13 discharge into a hydraulic unit 14 of an anti-skid apparatus. In the brake circuit I, wheel brake lines 15, 15.1 and 16, 16.1, respectively, lead from the hydraulic unit 14 to wheel brake cylinders 17 and 18 of the wheel brakes 19 and 20 of driven wheels of a first vehicle axle. One pressure generator unit 21 of an apparatus 22 for limiting drive slip, i.e., controlling traction, of the wheels of the first vehicle axle is located between the respective wheel brake lines 15 and 15.1 and 16 and 16.1. The pressure generator unit 21 is described in greater detail hereinafter. In the brake circuit II, wheel brake lines 23 and 24 are connected to the hydraulic unit 14. The wheel brake lines 23 and 24 lead to wheel brake cylinders 25 and 26 of the wheel brakes 27 and 28 of non-driven wheels of a second vehicle axis. An electronic control unit 29 for monitoring wheel rotation and triggering the hydraulic unit 14 for anti-skid operation or triggering the pressure generator unit 21 for traction control is also provided. Solenoids and a return pump, not shown in detail, are also incorporated in the hydraulic unit 14, so that in the event of the danger of locking of at least one wheel, the brake pressure in the appropriate wheel brake cylinder can be lowered, maintained or raised. If wheel slip of at least one of the driven wheels arises, the control unit 29, via lines 30 and 31, switches the pressure generator 21 on, in order to feed brake pressure into the applicable wheel brake cylinder and reduce the rpm of the driven wheels, so as to assure optimal adaptation to the coefficient of friction, or skid number, of the road surface.

The pressure generator unit 21 has one pressure generator 33 each, associated with the respective wheel brake cylinders 17 and 18. Since the pressure generators 33 are identical in structure and are disposed symmetrically to an axis A—A, the detailed illustration in FIGS. 2 and 3 and the ensuing description will be limited to the pressure generator connected to the wheel brake lines 16 and 16.1.

The pressure generator 33 has a housing 36 substantially comprising a housing part 34 and a connection head 3 joined to it. The housing 34 has a cylindrical bore 37, which fittingly receives a longitudinally displaceably guided cylinder 38. The cylinder 38 is hollow and is tightly closed on its end at the left in the drawing by a cap 39. On its right end, the cylinder 38 has a bottom 40 with a bore 41, in which a lip seal 42 is seated. The outside of the cylinder 38 is provided with a longitudinally extending set of teeth 48 in the manner of a rack, meshing with which is a pinion 44 of a motor drive mechanism 45 of the pressure generator 33.

In the vicinity of its end on the right, the bore 37 of the housing part 34 is closed off by a sleeve 48, which in turn is retained by means of the connection head 35 that is joined to the housing part 34. The sleeve 48 has a transverse wall 50 with a bore 51 adapted to receive a second lip seal 52. The sleeve 48 and the connection head 35 enclose a chamber 53 having a seat valve 54. The chamber 53 communicates hydraulically at one end via a line connection 55 and the wheel brake line 16 with the master brake cylinder 11 of the vehicle brake system 10, and on the other, via a line connection 56 and the wheel brake line 16.1, with the wheel brake cylinder 18.

The seat valve 54 has a valve seat 58 formed by the connection head 35, and a closing element 59 having a sealing lip of a rubber-elastic material is associated with this valve seat. The closing element 59 is supported on a collar 60 of a cylindrical actuating element 61, which extends coaxially with the cylinder 38 in the bore 37 of the housing part 34. The actuating element 61 is embodied as a thin-walled tube. With its portion 62 remote from the valve, it protrudes through the bore 41 into the cylinder 38, where with an outwardly oriented collar 63 it engages the cylinder bottom 40 from behind. On its portion 64 toward the valve, the actuating element 61 which extends through the bore 51 of the sleeve 48 into the chamber 53 is provided with connecting openings 65 to the chamber 53. Also located inside the chamber 53 is a helical compression spring 66 guided on the actuating element 61; the spring engages the collar 60 at one end and on the other end is supported on the transverse wall 50 defining the chamber 53 of the pressure generator housing 36. The cylinder 38, the actuating element 61 and the chamber 53 are filled with brake fluid, the escape of which into the bore 37 of the housing part 34 is reliably prevented by the fluid-tight guidance of the actuating element 61, with the aid of the lip seal 42 and 52. The guidance of the actuating element 61 in the bottom 40 of the cylinder 38 and in the transverse wall 50 of the sleeve 48 further provides a defined two-point support of the actuating element. This assures reliable contact of the valve closing element 59 with the valve seat 58 and improved function of the seat valve 54.

In FIG. 2, the cylinder 38 of the pressure generator 33 assumes its outset position, in which as a result of the engagement of the cylinder bottom 40 with the collar 63 of the actuating element 61, the seat valve 54 is retained in its open position counter to the force of the helical compression spring 66. In this position, the communication between the master brake cylinder 11 and the wheel brake cylinder 18 of the vehicle brake system 10 is open, and a brake pressure generated by the driver can become operative in the wheel brake 20.

Contrarily, if drive slip occurs at the wheel with which the pressure generator 33 is associated upon startup or acceleration of the vehicle, then the drive mechanism 45 is switched on by the control unit 29, and the cylinder 38 is moved toward the connection head 35. At the beginning of the cylinder stroke, the action of the helical compression spring 66 causes the seat valve 54 to close the communication, provided by the brake line 16, with the master brake cylinder 11. As the cylinder motion continues, brake fluid is expelled from the actuating element 61, which increasingly engages the cylinder 38, and from the cylinder, and brake pressure is built up in the wheel brake cylinder 18 via the bores 65 and the line connection 56 and wheel brake line 16.1. The cylinder motion is ended once the control unit 29 detects the elimination of excessive drive slip at the monitored vehicle wheel. A working position of maximum stroke assumed by the cylinder 38 of the pressure generator 33 is shown in FIG. 3 of the drawing. As soon as the control unit 29 detects stable wheel rotation, the cylinder 38 is returned to its outset position by reversal of the drive mechanism 45. During this reverse motion of the cylinder 38, a return flow of brake fluid out of the wheel brake cylinder 18 into the cylinder 38 of the pressure generator 33 is effected by means of the wheel brake line 16.1, the chamber 53 of the pressure generator housing 36 and the actuating element 61. Immediately before the return of the cylinder 38 to its outset position shown in FIG. 2, the bottom 40 engages the collar 63 of the actuating element 61 and moves the closing element 59 into the open position of the seat valve 54. The communication between the master brake cylinder 11 and the wheel brake cylinder 18 is now open.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure generator (33) for a hydraulic vehicle brake system (10) having an apparatus (22) for traction control comprising:
   a) a cylinder (38) for receiving brake fluid is adapted to be connected by means of a seat valve (54) to a line (16, 16.1) disposed between a master brake cylinder (11) and at least one wheel brake cylinder (18) of the vehicle;
   b) a cylindrical actuating element (61) of the seat valve (54) extends coaxially with the cylinder (38) and is shiftable, at the beginning of the expulsion of brake fluid out of the cylinder, into a position in which the seat valve keeps the line (16, 16.1) to the master brake cylinder (11) closed by a spring;
   c) upon the conclusion of the return flow of brake fluid out of the at least one wheel brake cylinder (18) into the cylinder (38), the seat valve (54) is movable into its open position by engagement on a collar (63) of the actuating element (61);
   d) the cylinder (38) is longitudinally displaceably guided by means of a drive mechanism (45) in a housing (36) of the pressure generator (33);
   e) the actuating element (61) of the valve (54) is embodied as a tube, which with its portion (62) remote from the valve engages the cylinder (38) in a fluid-tight manner; and
   f) the actuating element (61) which extends, with its portion (64) toward the valve (54) has at least one opening (65) leading into a chamber (53) of the pressure generator housing (36) which is connected to the line (16.1) that extends to the wheel brake cylinder (18).

2. A pressure generator as defined by claim 1, in which the outside of the cylinder (38) has a portion provided with a rack-like set of teeth (43) adapted to mesh with a pinion (44) of a motor drive mechanism (45).

3. A pressure generator as defined by claim 1, in which said spring for valve actuation is embodied as a helical compression spring (66), encircles a zone of the actuating element (61), said spring further being so arranged as to engage a collar (60) of the actuating element and a wall (50) which defines the chamber (53) of the pressure generator housing (36).

4. A pressure generator as defined by claim 1, in which a closing element (59), affixed to the actuating element (61), of the valve (54) comprises a sealing lip of elastic material.

* * * * *